US005235258A

United States Patent [19]

Schuerch

[11] Patent Number: 5,235,258

[45] Date of Patent: Aug. 10, 1993

[54] REMOTELY CONTROLLED ARTICULATED BED

[75] Inventor: F. Willy Schuerch, Biel, Switzerland

[73] Assignee: Santino Antinori, Tampa, Fla.; a part interest

[21] Appl. No.: 925,325

[22] Filed: Aug. 6, 1992

Related U.S. Application Data

[63] Continuation of Ser. No. 675,829, Mar. 27, 1991, abandoned.

[51] Int. Cl.[5] ........................ H04Q 7/00; A61G 7/015

[52] U.S. Cl. ........................................... 318/16; 5/616

[58] Field of Search ..................... 5/11, 60, 66, 67, 68, 5/446, 509, 69; 318/16, 114, 460, 119, 120, 128, 129, 130, 134, 434; 340/825.75, 825.77

[56] References Cited

U.S. PATENT DOCUMENTS

| | | | |
|---|---|---|---|
| Re. 31,603 | 6/1984 | Christensen | 128/33 |
| 3,781,927 | 1/1974 | Zakaras | 5/60 X |
| 3,913,153 | 10/1975 | Adams et al. | 5/66 X |
| 4,044,286 | 8/1977 | Adams et al. | 5/66 X |
| 4,370,602 | 1/1983 | Jones, Jr. et al. | 318/114 |
| 4,680,790 | 7/1987 | Packard et al. | 5/60 |
| 4,850,040 | 7/1989 | Teich et al. | 455/603 |
| 4,873,474 | 10/1989 | Johnson | 318/434 |
| 4,929,875 | 5/1990 | Olsson | 318/362 |
| 4,934,468 | 6/1990 | Koerber, Sr. et al. | 177/144 |
| 4,992,784 | 2/1991 | Ruttiger | 340/825.72 |
| 4,999,556 | 3/1991 | Masters | 318/599 |
| 5,007,410 | 4/1991 | DeLaney | 5/462 X |

*Primary Examiner*—Bentsu Ro
*Attorney, Agent, or Firm*—Diller, Ramik & Wight

[57] ABSTRACT

An articulated bed wherein all power signals within the mattress or supporting frame are maintained at 24 volt DC or less. Both body supporting surface manipulating motors and vibratory motors are accommodated. Remote control of all motors is provided, with control signals being processed as a function of a key in order to minimize the likelihood of instructions for one bed being intercepted and acted upon by another bed within range of the remote control device. A plurality of discrete vibration levels are accommodated through use of pulse width modulation control signals. Overload operation of the lifting motors is sensed, and the motors are immediately shut down regardless of whether contrary instructions are currently prevailing or being received.

35 Claims, 6 Drawing Sheets

FIG. 2
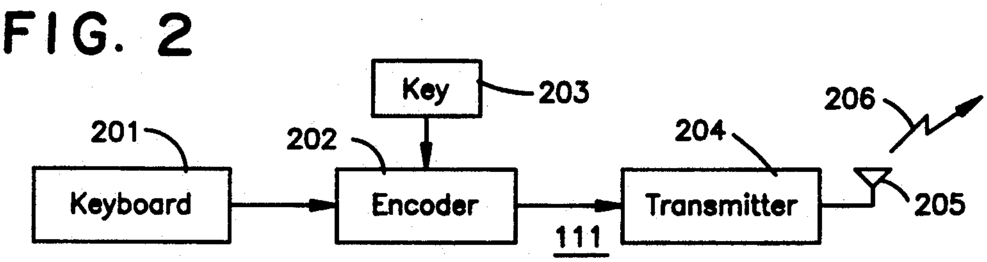
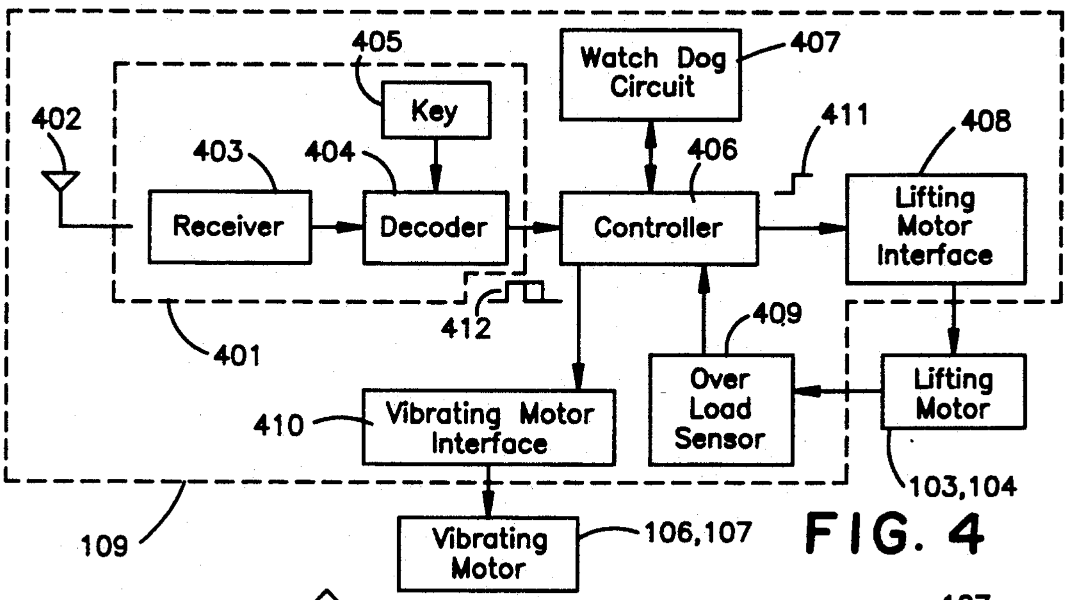
FIG. 4
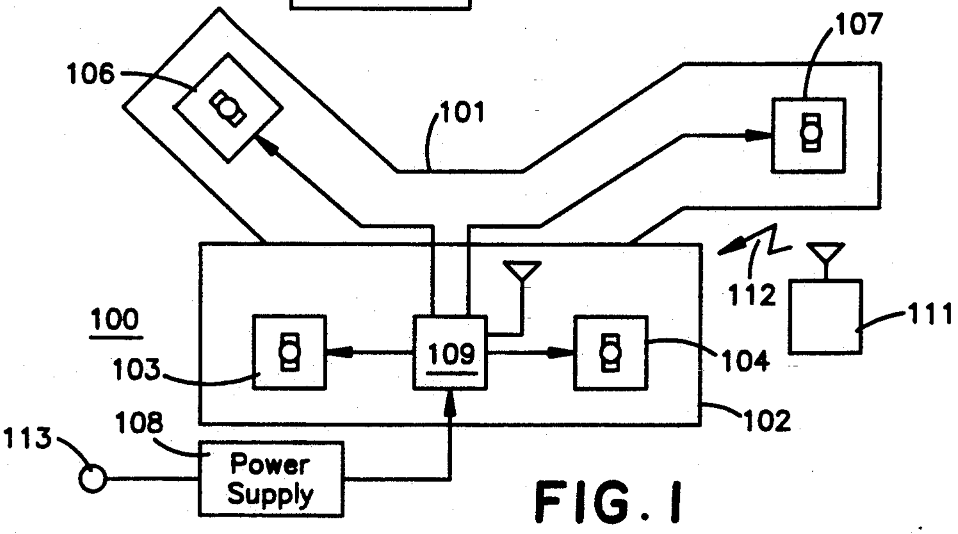
FIG. 1

REMOTELY CONTROLLED ARTICULATED BED

This application is a continuation of application Ser. No. 07/675,829, filed Mar. 27, 1991, now abandoned.

RELATED APPLICATIONS

This application relates generally to earlier filed U.S. patent application Ser. No. 07/518,134, filed on May 3, 1990 (abandoned) by Sechrist et al. and entitled Articulated Bed Arrangement.

TECHNICAL FIELD

This invention relates generally to the field of furniture, and more particularly to the field of beds and other sleeping or resting surfaces, and especially to beds having movement inducing or vibratory motors associated therewith.

BACKGROUND OF THE INVENTION

Articulated beds are known in the art. Such beds typically include a frame and a body supporting surface, such as a mattress. Mechanisms are provided to cause portions of the body supporting surface to be moved with respect to one another (such mechanisms are usually either mechanical or electro/mechanical). For example, such mechanisms typically allow the bed to be selectively articulated to position the feet or head of a person lying on the body supporting surface to be disposed in an elevated manner.

The general advantages of such articulated beds are well known. To date, however, such articulated beds have a number of problems associated therewith. For example, such beds are typically operated by accessing a fixed position control panel. This often makes operation of the bed inconvenient, or even impossible, for some users. Remote control devices are of course generally known in the art, and generally do not require a fixed location control panel. Use of such devices with articulated beds gives rise to other problems, however. For example, where a number of articulated beds are located in relatively close proximity to one another (such as in a hospital, nursing home, apartment complex, or the like), remote control signals intended for one bed are likely to be received and acted upon by other beds as well, thereby negating the positive benefits of comfort and/or therapeutic value ordinarily associated with such beds.

Other problems exist as well. Though it is desirable to provide a plurality of motors in such a bed to accommodate a variety of body supporting surface alterations and/or to impart vibration to various parts of the body supporting surface, facilitating easy control of such functions becomes significantly more challenging as the number of functions to be controlled increases. Also, a potentially more serious problem concerns provision of power to the various motors in the bed. Typically, such beds are provided with AC power (50 or 60 Hz at various known voltage levels, such as 110, 120, or 240 volts), and this power is used to power the motors. The use of such levels poses a potential risk to the user of the bed; a short circuit between the user and the AC power, however inadvertent or brief, can be life threatening.

A need therefore exists for an articulated bed that avoids the need for a fixed location control panel, that can be remotely operated without interfering with the operation of other similarly operated beds nearby, that can readily accommodate a relatively generous number and variety of motor control signals in a substantially user friendly manner, and that minimizes the risk of electric shock.

SUMMARY OF THE INVENTION

Accordingly, it is an object of the present invention to provide an improved articulated bed.

It is another object of the present invention to provide an articulated bed that can be operated remotely, without likely interfering with other remotely operated articulated beds in the area.

It is another object of the present invention to provide an articulated bed that will accommodate remote control of a wide variety of motor control functions, both with respect to body supporting surface control and vibration.

It is yet another object of the present invention to provide an articulated bed that can accommodate the integral use of electric motors and other controlling circuitry with a minimized risk of life threatening electrical shock associated therewith.

These and other objects of the invention are achieved through provision of an articulated bed having a body supporting surface, at least one motor for moving the body supporting surface, and a control unit for controlling operation of the motor. The bed also includes a wireless receiver that receives keyed motor control signals as broadcast by a wireless transmitter.

In one embodiment, the wireless transmitter processes the motor control signals as a function of a key, and the wireless receiver processes the received keyed motor control signals as a function of the same key to thereby recover the original motor control signals. So configured, the keyed motor control signals will not be used by another bed that does not use the same key.

In one embodiment, the key can be used as an encryption key to reorganize the control signals pursuant to an appropriate algorithm. In another embodiment, the key can be an ID number or the like that is transmitted with the control signals as an identifier; beds that are not programmed to respond to that particular identifier will ignore the control signals bundled therewith.

In one embodiment, the above elements directly associated with the bed are housed either within the bed frame or the body supporting surface itself, and no element is powered by more than 24 volts DC. An external power supply is also provided, which power supply couples to a standard AC power source. The power supply converts the AC power to the 24 volt DC (or less) power signals required to operate the elements located in the bed itself. Consequently, the risk of life threatening shock to the user is reduced since 24 volts DC constitutes the largest signal available in the bed itself.

In yet another embodiment, the wireless transmitter includes a keypad sufficient to accept input corresponding to a wide variety of instructions, both for body supporting surface movement and for vibration impartation. With respect to the former, controls signals can be generated with respect to movement of particular portions of the body supporting surface, and to the direction of movement. With respect to the latter, control signals can be generated with respect to initiation or termination of vibration in particular portions of the body supporting surface, and with respect to a plurality of discrete levels of vibration.

BRIEF DESCRIPTION OF THE DRAWINGS

These and other attributes of the invention will become more clear upon making a thorough review and study of the following description of a preferred embodiment, particularly when reviewed in conjunction with the drawings, wherein:

FIG. 1 comprises a side elevational diagrammatic depiction of an articulated bed in accordance with the invention;

FIG. 2 comprises a block diagram depiction of a wireless transmitter in accordance with the invention;

FIG. 4 comprises a block diagram depiction of a wireless receiver, control circuits, and controlled elements, all in accordance with the invention;

DESCRIPTION OF THE PREFERRED EMBODIMENT

Figure 3:
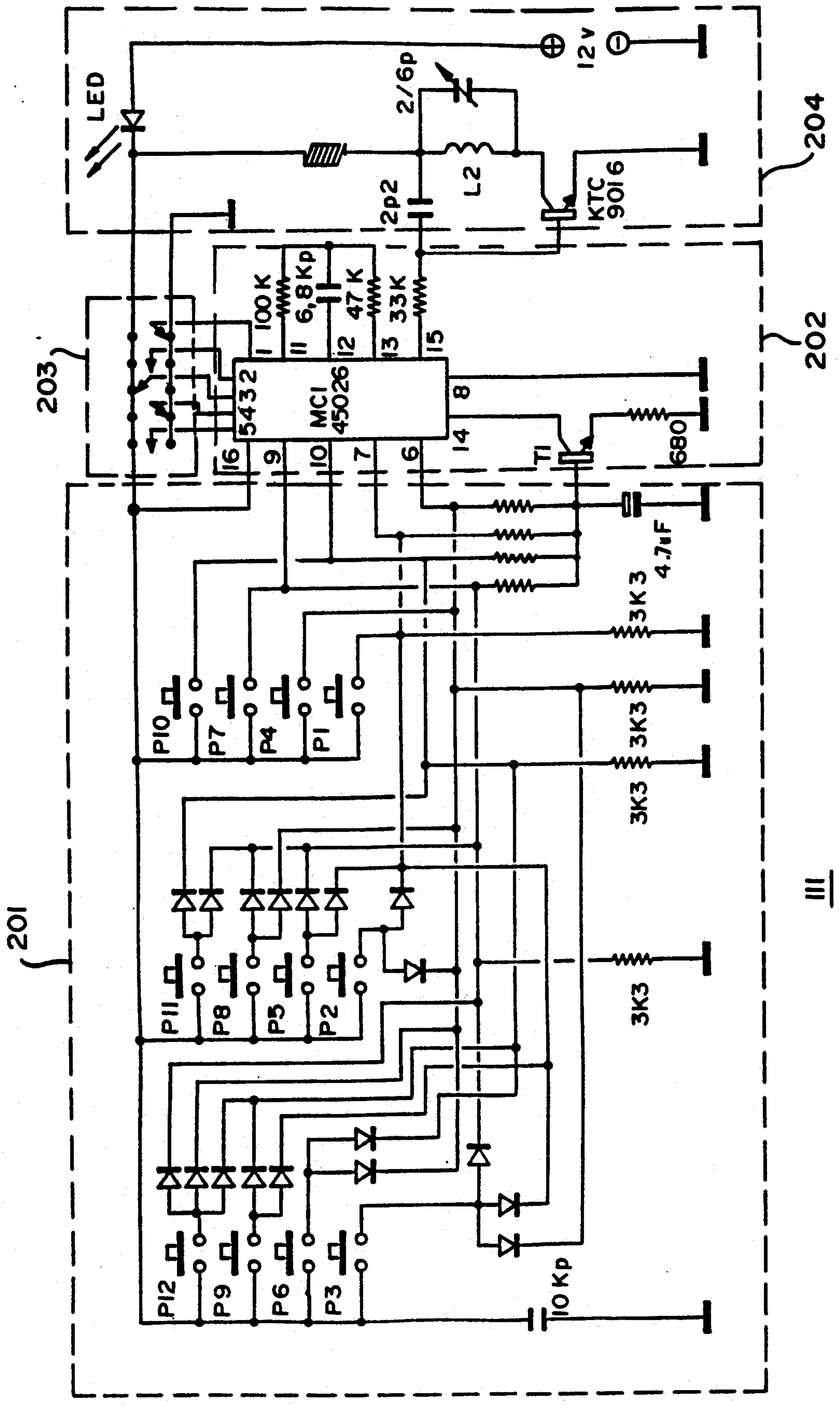
FIG. 3 comprises a schematic diagram of the wireless transmitter in accordance with the invention.

Referring now to the drawings, and in particular to FIG. 1, an articulated bed can be seen generally as depicted by reference numeral 100. The articulated bed 100 includes generally a body supporting surface 101 and a frame 102 to support the body supporting surface. In a well understood manner, the body supporting surface 101 comprises a mattress with an articulated skeletal structure that allows the mattress to be manipulated into various positions, thereby allowing an individual using the bed to raise his or her head, or legs and feet, as desired to obtain various therapeutic affects or degrees of comfort.

To effect movement of the body supporting surface 101, two lifting motors 103 and 104 are provided in the frame 102. These motors 103 and 104 drive appropriate mechanical coupling devices (not shown) to cause portions of the body supporting surface 101 to move as noted above. The body supporting surface 101 also has disposed therewithin two vibrating motors 106 and 107; one such motor 106 has been positioned to impart vibration to that portion of the body supporting surface 101 that supports the head and/or upper body of a user, and the other motor 107 has been positioned to impart vibration to that portion of the body supporting surface 101 that supports the feet and/or lower leg extremities. (Other locations for the vibrating motors could of course be chosen to meet other intended applications.)

These various motors are all powered by an external power supply 108 that couples to a standard AC power source 113, and are all controlled by a control unit 109. The control unit 109, in turn, responds to a remote control unit 111. The remote control unit 111, in this embodiment, comprises a wireless transmitter that transmits amplitude modulated keyed control signals 112 to the control unit 109. The control unit 109 receives these keyed control signals 112, decodes them, and controls the various motors in accordance therewith.

All of the above controlled and controlling elements will be described in more detail below where appropriate. In addition, for supplemental information regarding such articulated beds, the reader is referred to U.S. patent application Ser. No. 07/518,134, filed on May 3, 1990 (abandoned) by Sechrist et al. for an Articulated Bed Arrangement, the contents of which are incorporated herein by this reference.

In FIG. 2, the remote control unit 111 can be seen to be generally comprised of a keyboard 201, an encoder 202, a key 203, a transmitter 204, and a radiating element 205.

The keyboard 201 comprises an appropriate input device for allowing a user of the bed (or other individual responsible for the individual using the bed) to enter desired instructions regarding operation of the bed. For example, with respect to the lifting motors 103 and 104, a user can enter instructions regarding raising and lowering selecting portions of the body supporting surface 101. With respect to the vibratory motors 106 and 107, a user can enter instructions regarding activation and deactivation of either or both motors and a corresponding amount of vibration.

The keyboard 201 accepts these control instructions and provides representative control signals to the encoder 202. The encoder 202 prepares these signals for transmission, and in particular, processes the signals as a function of a key 203. For example, the processing can include encrypting the control signals as a function of the key in conjunction with an encryption algorithm. Or, by way of another example, the key 203 can simply comprise an identifier that is bundled with the control signal prior to transmission.

The keyed control signals are then provided to the transmitter 204, where they are amplitude modulated onto a selected one of three possible carrier frequencies (380, 410, and 435 Mhz). The resultant modulated carrier signal 206 then radiates from the radiating element 205, in accordance with well understood prior art technique. (Other appropriate carrier frequencies could of course be used, and other modulation schemes could be selected as well.)

With reference to FIG. 3, certain aspects of the remote control device 111 will now be described in more detail.

The keyboard 201, in this embodiment, comprises twelve push button switches P1 through P12. When actuated by a user, these switches produce a temporary closed circuit. Via the circuit matrix depicted (comprised of a plurality of diodes, resistors, and capacitors), the encoder 202 identifies the particular switch actuated, and processes that information as a function of the key 203 to provide a nine bit keyed control signal at its output to the transmitter 204. Using the switch matrix depicted to provide the key 203, this embodiment will accommodate 243 different keys, thereby greatly minimizing the likelihood of interference between nearby beds.

Additional description regarding the encoder 202 and the transmitter 204 can be found in the previously mentioned Ser. No. 07/518,134 (abandoned) and hence will not be repeated here.

Referring now to FIG. 4, the various elements disposed within the body supporting surface 101 and/or frame 102 are generally depicted. The control unit 109 can be seen to include generally a signal receiver 401, a controller 406, a lifting motor interface 408, and a vibrating motor interface 410. Also provided are a watch dog circuit 407 and an overload sensor 409.

The signal receiver 401 includes generally an antenna 402, a receiver 403, a decoder 404, and a key 405. The receiver 403 converts the amplitude modulated carrier signal transmitted by the remote control unit 111 into a recovered keyed control signal in accordance with well understood prior art technique. The recovered keyed control signal is then processed in the decoder 404 as a function of the key 405 (which is, of course, the same key 203 as that used in the remote control device 111 to provide a recovered control signal that corresponds to the original instruction initiated by the user upon actuating the remote control device keyboard 201.

The controller 406 receives the control signal and determines a proper response. If the instruction relates to the lifting motors 103 and 104, the controller 406 issues an appropriate signal 411 to the lifting motor interface 408, which in turn provides an appropriate signal to whichever of the motors 103 or 104 the control is intended for. For example, if the user instructed the system to lower the head portion of the body supporting surface, the control signal would correspond to that instruction, and the controller would issue a resultant signal 411 that would cause the associated motor 103 to activate in a particular direction of rotation to cause the head portion to lower.

This embodiment also provides an overload sensor 409 that senses whether the lifting motors 103 and 104 are operating in an overloaded mode. When an overload is sensed, the overload sensor 409 provides this information to the controller 406, and the controller 406 deactivates the affected motor, regardless of whether contrary instructions are then being acted upon or received, thereby protecting the motor (and possible the bed and/or user) from damage or injury.

If the instructions relate instead to the vibratory motors 106 or 107, the controller 406 issues an appropriate controlling signal 412 to the vibrating motor interface 410, which in turn controls the appropriate vibrating motor 106 or 107 to effect the desired action. In this embodiment, the vibratory motors 106 and 107 can be individually activated or deactivated. In addition, each motor can be driven to produce any of five discrete levels of vibration. To accomplish this, the controller 406 provides a pulse width modulated control signal 412, wherein the width of the pulse determines the vibration level.

Also in this embodiment, the controller 406 includes an internal timer. This timer monitors the duration of activation for each vibrating motor 106 and 107. When a particular period of activation exceeds a selected threshold, the controller 406 deactivates that particular motor, notwithstanding the possible current reception of contrary signals. In this embodiment, the threshold is about twenty minutes, and this protects the user from undue exposure to vibration.

Figure 5:
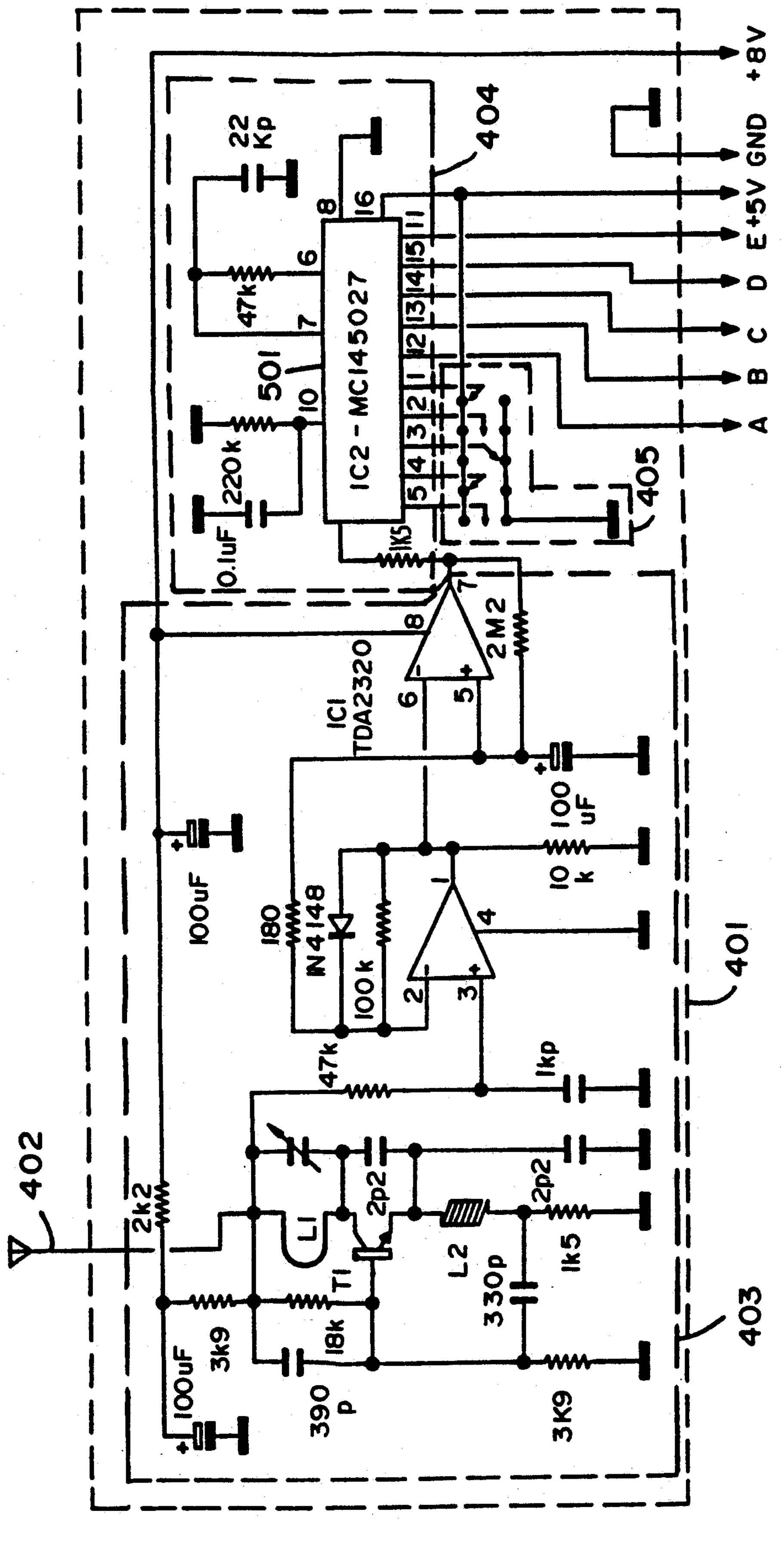
FIG. 5 comprises a schematic diagram of the wireless receiver in accordance with the invention.

Referring now to FIG. 5, the signal receiver 401 will be described in more detail.

The receiver 403 itself comprises a superregenerative receiver and is essentially set forth and described in the Ser. No. 07/518,134 referred to above. Therefore, no additional detail need be set forth here.

The decoder 404 includes an MC145027 decoder 501 as manufactured and sold by Motorola, Inc. The recovered keyed control signal from the receiver 403 is provided to pin 9 of the MC145027. The MC145027 processes the keyed control signal as a function of the key 405 provided by the switches that are coupled to pins 1 through 5 of the MC145027, and provides the resultant recovered control signal at its output (pins 11 through 15).

Figure 6:
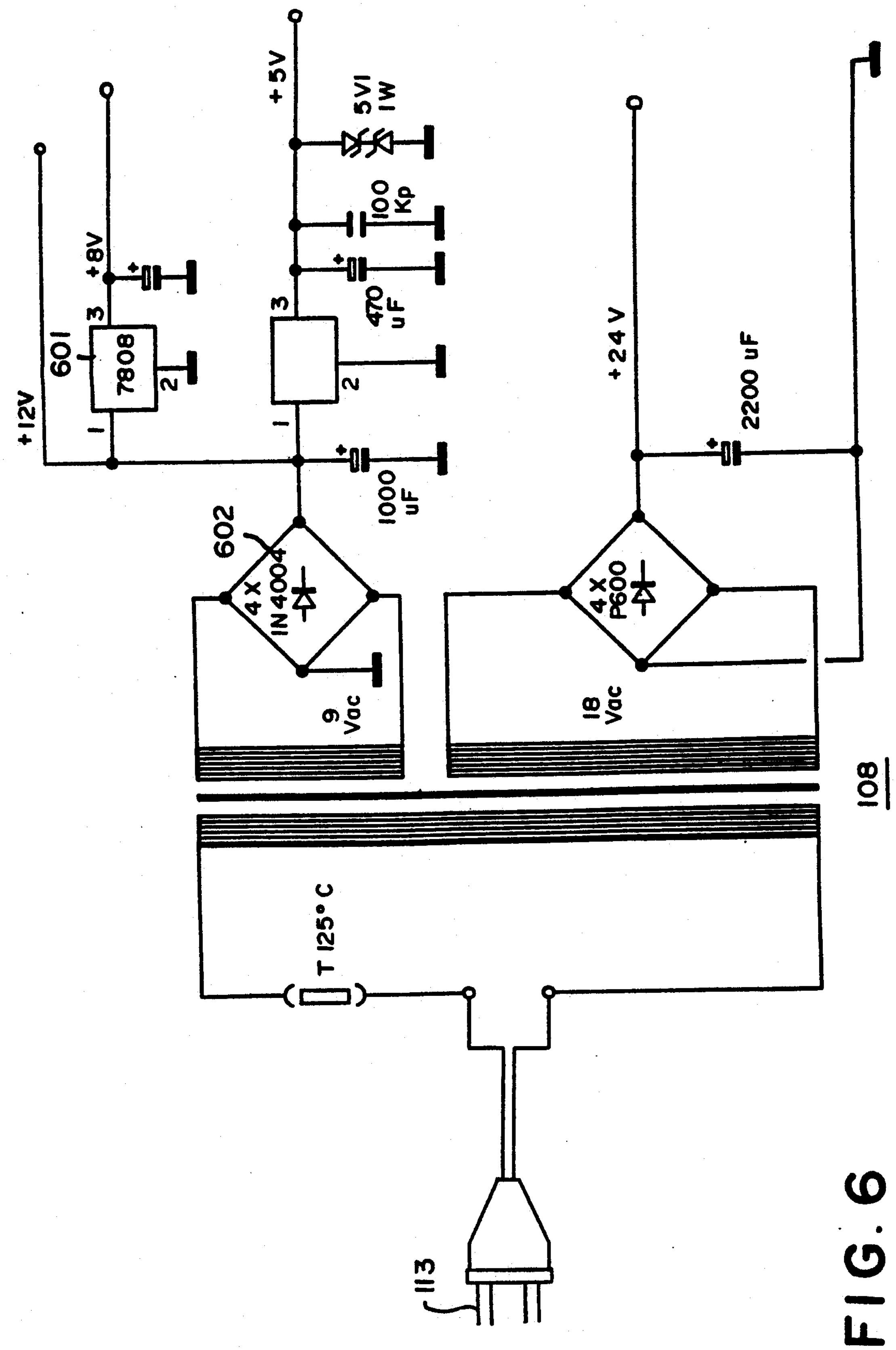
FIG. 6 comprises a schematic diagram of a power supply in accordance with the invention.

Referring now to FIG. 6, the external power supply 108 will be described in more detail.

The external power supply 108 couples 113 to an appropriate source of standard AC power (such as 50 or 60 Hz at 110, 120, or 240 volts). As configured, the power supply 108 provides 5 volts DC, 8 volts DC, 12 volts DC, and 24 volts DC. These voltages are provided to the various circuit elements, described above and below, as appropriate. The previously mentioned Ser. No. 07/518,134 provides a description of that part of the power supply 108 that provides the 5 volt and 24 volt DC, and hence that portion of the power supply 108 need not be redescribed here. To provide the 8 volt DC, a 7808 voltage regulator 601 couples to the 12 volt output of the first rectifier bridge 602. The output of the regulator 601 is filtered by a capacitor 603, and this 8 volt DC source is used primarily to drive the receiver 403 of the code receiver 401. The 12 volt DC source is taken directly from the output of the first rectifier 602, and is used in conjuction with the lifting motor interface 408, as described below in more detail.

Importantly, the power supply 108 is located external to the body supporting surface 101 and the frame 102. Only the relatively low voltage DC signals are delivered into the body supporting surface 101 and frame 102 to provide the necessary operating power to the various controlling and controlled elements.

Figure 7:
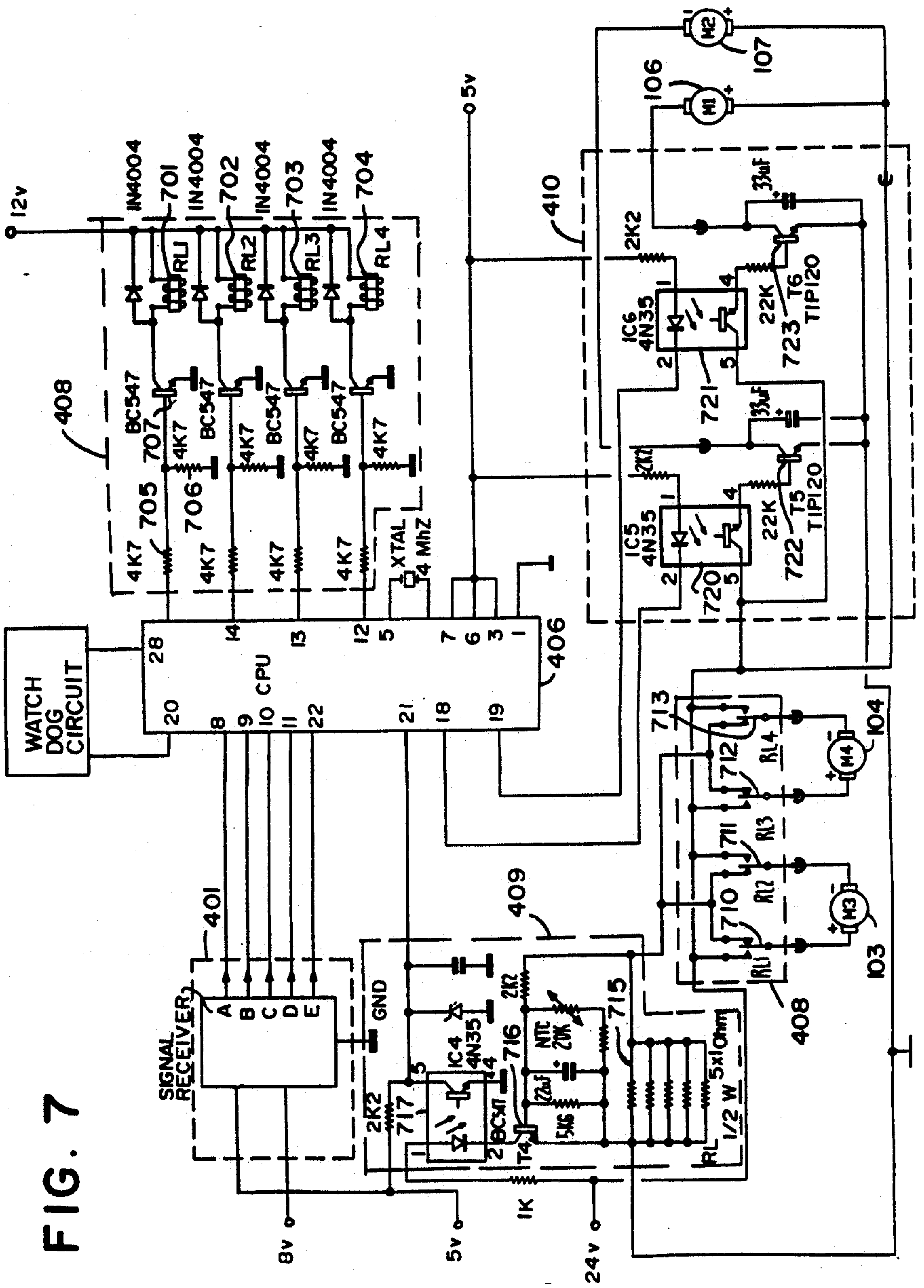
FIG. 7 comprises a schematic diagram of a controlling circuit and various controlled elements in accordance with the invention.

Referring now to FIG. 7, the controller 406 is provided through use of an MC68705P3 central processing unit (CPU) as manufactured and sold by Motorola, Inc. The five output lines from the signal receiver 401 are provided to five input ports of the CPU 406 (pins 8 through 11 and 22). Four of the CPU's output ports (pins 12 through 15) couple to the lifting motor interface 408, and two of the output ports (pins 18 and 19) couple to the vibrating motor interface 410.

The lifting motor interface 408 has four separate relays 701 through 704, configured such that each of the CPU's output pins dedicated to this interface 408 will control one of the relays. In particular, each output pin couples through a voltage divider comprised of two resistors 705 and 706 to the base of a switch transistor 707. When the transistor 707 for a particular relay is switched on by the CPU 406, a circuit is completed between the 12 volt DC source and ground through the windings of that relay, thereby energizing that relay and causing an associated switch to close. The switches associated with the four relays are shown as being coupled to each terminal of the two lifting motors 103 and 104, respectively, with the switches being denoted by the reference numerals 710 through 713. With the switches configured as depicted, either motor 103 and 104 can be activated with respect to a particular direction of rotation, or deactivated.

The overload sensor 409 comprises a resistor network 715 that couples to sense current draw through the motors 103 and 104. When the current draw exceeds a threshold determined by the resistor network 715, thereby indicating that an overload condition exists, a transistor 716 is biased on and pin 21 of the CPU 406 is set low through an optocoupler 717 (this and other optocouplers described below can be provided through use of a 4N35). When pin 21 of the CPU 406 goes low, output pins 12 through 15 are immediately taken low as well, thereby causing all of the relays 701 through 704 to be deenergized. This, of course, removes power from all of the lifting motors 103 and 104, thereby preserving the motors from possible harm due to the overload condition.

As noted above, CPU output pins 18 and 19 couple to the vibrating motor interface 410. In each case, the output pin connects to a corresponding optocoupler 720 or 721. When switched on, these optocouplers 720 and 721 in turn switch on an associated drive transistor 722 and 723. The latter, when switched on, complete a circuit between the 24 volt DC source and ground through a corresponding vibration motor 106 or 107. The control signal from the CPU constitutes a pulse width modulated signal, and in this embodiment, the signal can have any of five preselected widths. The drive transistor 722 and 723 will remain switched on for the duration of the control pulse width, such that the longer the pulse width, the longer the corresponding vibration motor will remain on, thereby significantly influencing the amount of vibration imparted to the body supporting surface 101 in the vicinity of the vibrating motor.

Figure 8:
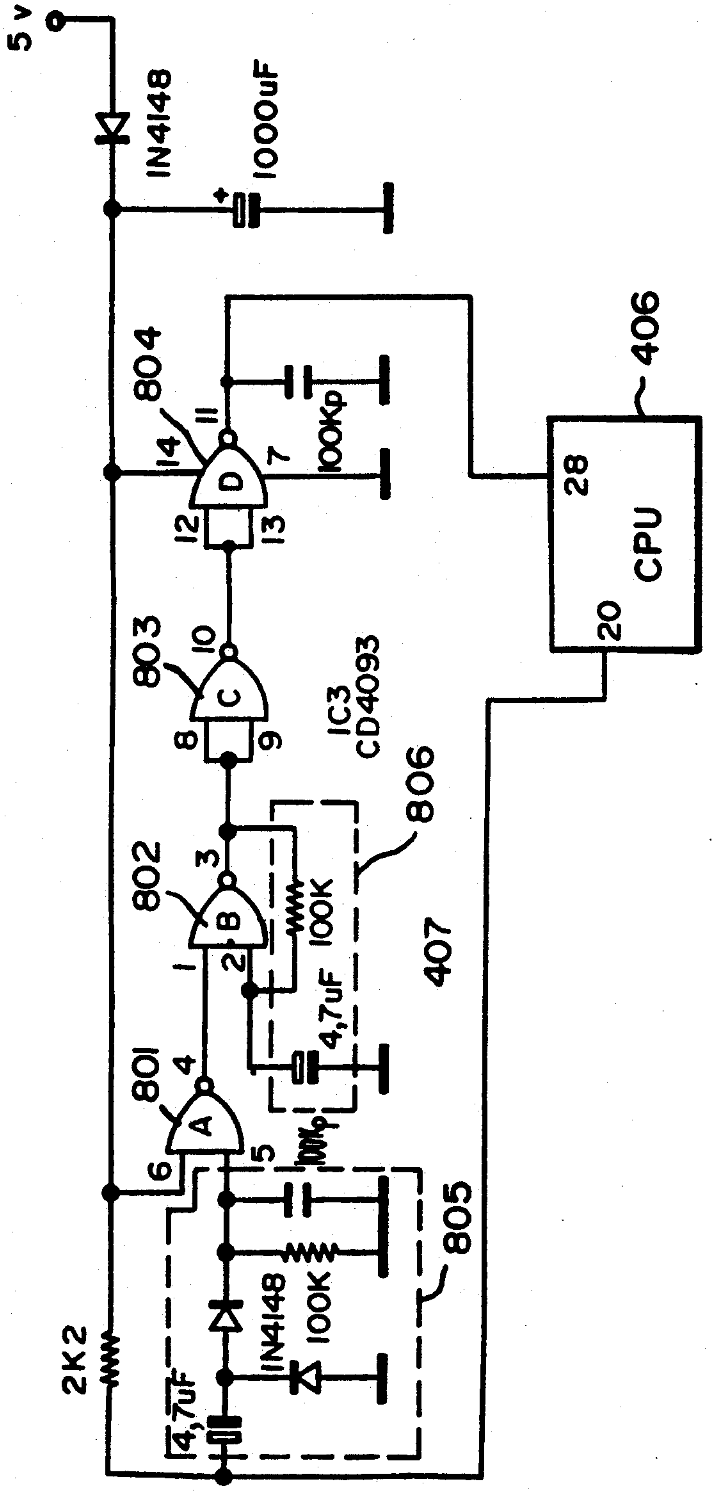
FIG. 8 comprises a schematic diagram of a watch dog circuit in accordance with the invention.

Referring now to FIG. 8, the watch dog circuit will be described in more detail.

The watch dog circuit 407 is constructed about a CD4093 having four 2 input NAND gates 801 through 804. Pin 20 of the CPU 406 couples through a signal conditioning network 805 to an input of the first NAND gate 801 (the signal conditioning network essentially comprises a timing network that will eventually respond to the lack of a signal from pin 20 of the CPU 406). When pin 20 remains low for too long a period of time (thereby indicating a problem), the first NAND gate 801 goes high, causing the second NAND gate 802 to go low, the third NAND gate 803 to go high, and the fourth NAND gate 804 to go low. The output of the fourth NAND gate 804 couples to the reset port of the CPU (pin 28). When the reset port goes low, the CPU is reset. The low condition at the reset port will continue for a period of time determined by the timing network 806 associated with the second NAND gate 802.

By provision of the above described articulated bed, a fixed position control panel can be avoided without simultaneously increasing the risk that operation of one bed will interfere with the operation of other nearby beds. Further, a wide variety of control features can all be remotely controlled, including body supporting surface manipulation and vibration. Also, risk of life threatening electric shock is significantly reduced.

Those skilled in the art will appreciate that various modifications could be made to the above described embodiments without departing from the inventive concepts set forth.

I claim:

1. An articulated article of furniture comprising:

A) a body supporting surface having at least first and second portions thereof being movable with respect to one another;

B) a motor operably coupled to at least one of the first and second portions;

C) control means operably coupled to the motor for controlling the motor, and hence, controlling positioning of the first portion with respect to the second portion, in response to reception of motor control signals;

D) wireless receiver means operably coupled to the control means, for receiving encryted motor control signals and for providing the encrypted motor control signals to the control means.

2. The articulated article of furniture of claim 1, and further including frame means for supporting the body supporting surface.

3. The articulated article of furniture of claim 2, wherein the motor, control means, and wireless receiver means are all disposed within the frame means.

4. The articulated article of furniture of claim 3, wherein the motor, control means, and wireless receiver means are each powered by no more than 24 volts DC.

5. The articulated article of furniture of claim 4, and further including power supply means disposed exterior to the frame means for providing the no more than 24 volts DC, wherein the power supply means includes:

i) first means for coupling to an AC power source to receive an AC power signal; and ii) second means operably coupled to the first means for converting the AC power signal into the no more than 24 volts DC.

6. The articulated article of furniture of claim 1, and further comprising:

E) wireless transmitter means for:

i) sourcing motor control signals;

ii) processing the motor control signals as a function of a preselected key to provide the encryted motor control signals; and iii) transmitting the encryted motor control signals to the wireless receiver means.

7. The articulated article of furniture of claim 6, wherein the wireless receiver means further includes means for processing the encryted motor control signals as a function of the preselected key to recover the encryted motor control signals.

8. The articulated article of furniture of claim 1, and further comprising:

E) vibration means for imparting vibration to at least some part of the body supporting surface; wherein the control means is further coupled to the vibration means for controlling the vibration means, and hence, controlling impartation of vibration to at least some part of the body supporting surface, in response to reception of vibration control signals.

9. The articulated article of furniture of claim 8, wherein the wireless receiver means further functions to receive encryted vibration control signals and to provide the encryted vibration control signals to the control means.

10. The articulated article of furniture of claim 9, and further including frame means for supporting the body supporting surface.

11. The articulated article of furniture of claim 10, wherein the motor, vibration means, control means, and wireless receiver means are each disposed within the frame means.

12. The articulated article of furniture of claim 11, wherein the motor, vibration means, control means, and wireless receiver means are all powered by no more than 24 volts DC.

13. The articulated article of furniture of claim 12, and further including power supply means disposed exterior to the frame means for providing the no more than 24 volts DC, wherein the power supply means includes:

i) first means for coupling to an AC power source to receive an AC power signal; and ii) second means operably coupled to the first means for converting the AC power signal into the no more than 24 volts DC.

14. The articulated article of furniture of claim 9, and further comprising:

F) wireless transmitter means for:

i) sourcing motor control signals and vibration control signals;

ii) processing the motor control signals and vibration control signals as a function of a preselected key to provide the encrypted motor control signals and encrypted vibration control signals; and iii) transmitting the encrypted motor control signals and encrypted vibration control signals to the wireless receiver means.

15. The articulated article of furniture of claim 14, wherein the wireless receiver means further includes means for processing the encrypted motor control signals and encrypted vibration control signals as a function of the preselected key to recover the encrypted motor control signals and the encrypted vibration control signals.

16. The articulated article of furniture of claim 15, wherein the motor control signals includes signals to control:

i) activation of the motor;

ii) deactivation of the motor;

iii) direction of rotation of the motor.

17. The articulated article of furniture of claim 16, wherein the motor control means includes means for sensing an overload condition with respect to operation of the motor, and for deactivating operation of the motor in response thereto, regardless of whether an encrypted motor control signal contrary to deactivation is then currently being received by the wireless receiver means.

18. The articulated article of furniture of claim 15, wherein the encrypted vibration control signals includes signals to control:

i) activation of the vibration means;

ii) deactivation of the vibration means;

iii) levels of vibration imparted to the body supporting surface.

19. The articulated article of furniture of claim 18, wherein the encrypted vibration control signals related to the levels of vibration imparted to the body supporting surface include a plurality of discrete vibration levels.

20. The articulated article of furniture of claim 19, wherein the plurality of discrete vibration levels comprise five separate levels of vibration.

21. The articulated article of furniture of claim 18, wherein the control means includes clock means for causing deactivation of the vibration means following a predetermined period of duration of activation, regardless of whether an encrypted vibration control signal contrary to deactivation is then currently being received by the wireless receiver means.

22. The articulated article of furniture of claim 21, wherein the predetermined period of duration of activation is approximately twenty minutes.

23. The articulated article of furniture of claim 1 wherein at least one of the motor, control means, and wireless receiver means is powered by no more than 24 volts DC.

24. The articulated article of furniture of claim 1 wherein the motor is powered by no more than 24 volts DC.

25. The articulated article of furniture of claim 1 wherein the control means is powered by no more than 24 volts DC.

26. The articulated article of furniture of claim 1 wherein the wireless receiver means is powered by no more than 24 volts DC.

27. The articulated article of furniture of claim 1 wherein the motor and the control means are each powered by no more than 24 volts DC.

28. The articulated article of furniture of claim 1, wherein the motor and the wireless receiver means are each powered by no more than 24 volts DC.

29. The articulated article of furniture of claim 1 wherein the control means and the wireless receiver means are each powered by no more than 24 volts DC.

30. The articulated article of furniture of claim 1 wherein the motor, control means, and wireless receiver means are each powered by no more than 24 volts DC.

31. An articulated article of furniture, comprising:

A) a body supporting surface having at least first, second, and third portions thereof and being movable with respect to one another;

B) a first motor operably coupled to the first portion;

C) a second motor operably coupled to the third portion;

D) first vibration means for imparting vibration to at least some part of the body supporting surface;

E) control means operably coupled to the first and second motor and the first vibration means, for controlling the first and second motor and the first vibration means, thereby controlling positioning of the first, second, and third portions with respect to one another, and the impartation of vibration to the body supporting surface, in response to reception of first encrypted motor control signals, second encrypted motor control signals, and first encrypted vibration control signals;

F) wireless receiver means operably coupled to the control means, for receiving encrypted motor control signals and encrypted vibration control signals, and for providing the first encrypted motor control signals, the second encrypted motor control signals, and the first encrypted vibration control signals to the control means.

32. The articulated article of furniture of claim 31, wherein the control means operably couples to the first and second motor through a plurality of relays, and operably couples to the first vibration means through at least one optocoupler.

33. The articulated article of furniture of claim 32, wherein the control means provides pulse width modulated signals to the at least one optocoupler.

34. An article of furniture comprising:

A) a body supporting surface having at least first and second portions thereof and being movable with respect to one another;

B) a motor operably coupled to at least one of the first and second portions;

C) vibration means for imparting vibration to at least some part of the body supporting surface;

D) control means operably coupled:

i) to the motor through at least one relay for controlling the motor, and hence, controlling positioning of the first portion with respect to the second portion, in response to reception of motor control signals; and ii) to the vibration means through at least one optocoupler for controlling the vibration means, and hence, controlling impartation of vibration to at least some part of the body supporting surface, in response to reception of vibration control signals;

E) wireless receiver means operably coupled to the control means for receiving:

i) keyed motor control signals and for providing the motor control signals to the control means; and ii) keyed vibration control signals and for providing the vibration control signals to the control means.

35. The articulated article of furniture of claim 34, wherein the control means controls the vibration means through provision of pulse width modulated drive signals.

* * * * *